(12) United States Patent
Caboverde

(10) Patent No.: US 7,513,767 B2
(45) Date of Patent: Apr. 7, 2009

(54) APPARATUS FOR PREPARING FRIED PLANTAINS FOR FILLING OR TOPPING

(76) Inventor: Enrique Caboverde, 984 NE. 145 St., N. Miami, FL (US) 33161

( * ) Notice: Subject to any disclaimer, the term of this patent is extended or adjusted under 35 U.S.C. 154(b) by 0 days.

(21) Appl. No.: 10/905,833

(22) Filed: Jan. 21, 2005

(65) Prior Publication Data

US 2006/0162250 A1     Jul. 27, 2006

(51) Int. Cl.
*B28B 3/00* (2006.01)
*A23P 1/00* (2006.01)

(52) U.S. Cl. ................ 425/318; 425/422; 425/441; 426/512; 426/514

(58) Field of Classification Search ................ 425/318, 425/422, 441, 436 RM, 403.1, 444; 426/512, 426/514; 264/512, 514
See application file for complete search history.

(56) References Cited

U.S. PATENT DOCUMENTS

| | | | | |
|---|---|---|---|---|
| 320,541 A | * | 6/1885 | Crossley et al. | 100/218 |
| 584,693 A | * | 6/1897 | Marshall | 425/416 |
| 2,135,025 A | * | 11/1938 | Batjer | 425/318 |

* cited by examiner

*Primary Examiner*—Yogendra Gupta
*Assistant Examiner*—Emmanuel S Luk

(57) ABSTRACT

This invention shapes a thick slice of green or ripened plantain into an open rectangular bowl that can be filled with various edible foods such as, but not limited to, chicken, shrimp, beef, and custard, and also pushes the plantain out mold by the use of a very simple, yet efficient, mechanism.

1 Claim, 6 Drawing Sheets

Plantain slice inside of tray, before shaping.

Finished product of invention.

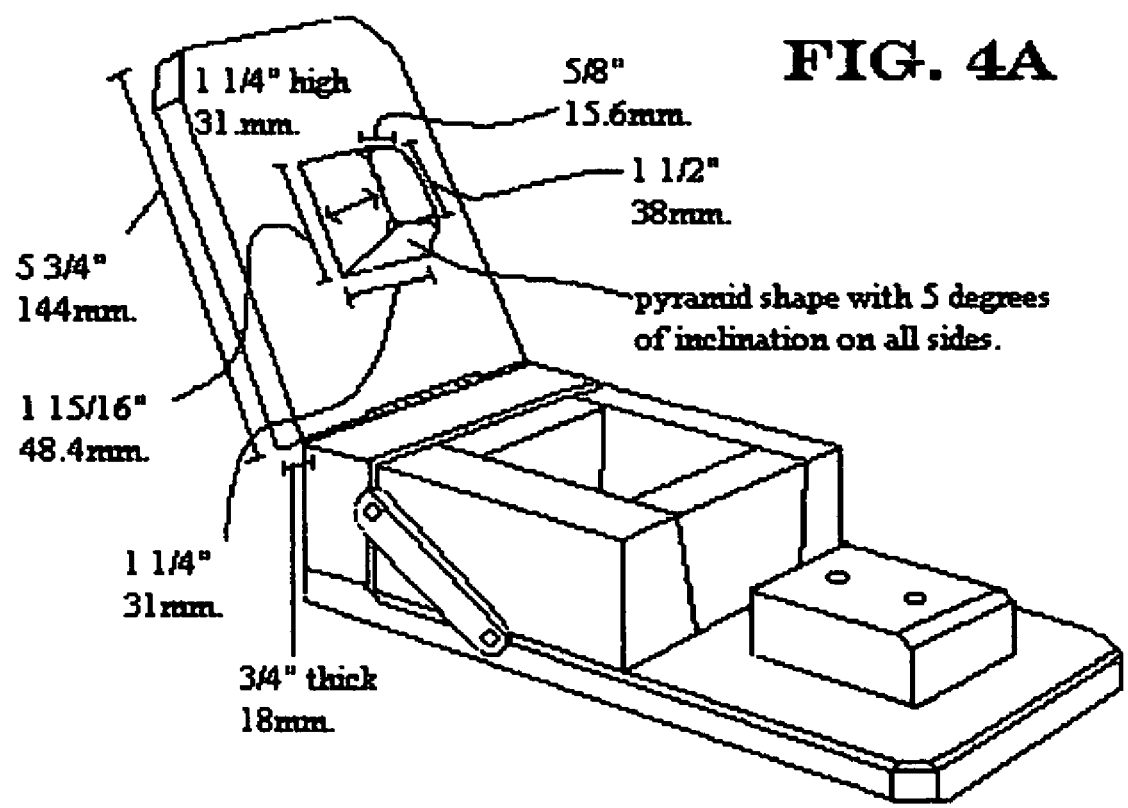

APPARATUS FOR PREPARING FRIED PLANTAINS FOR FILLING OR TOPPING

FIELD OF INVENTION

The present invention generally relates to the processing of plantains, and more specifically, to an apparatus for processing a plantain in between it first and second trip to a fryer creating a rectangular bowl out of a plantain slice that can later be filled with whatever the consumer desires.

BACKGROUND ART

This invention is in the field of hand-operated apparatuses and is specifically for the use of preparing a plantain after frying the first time. Considered a staple food for the Caribbean, Central and South America, the plantain is cooked in a variety of ways. One particularly popular way of cooking it is to fry it, dip it in a salty solution, flatten it, and fry it a second time. This is generally called a "tostón" or "patacón." Due to the plantains starchy nature, this is a perfect way to prepare it. Current technology of preparing the plantain, for personal use, is simply to use a hard flat surface to flatten the plantain against a tabletop or other hard surface or to flatten it between two short boards of wood. In some countries the "tostón" is topped with some other food that complements it.

SUMMARY OF INVENTION

This invention offers an alternative to flattening the plantain and provides a more aesthetically pleasing, finished product when topped or filled. Furthermore, this invention includes a very simple mechanism that is unique to this apparatus compared to other similar apparatuses. This apparatus has very simple mechanism that removes the plantain for the mold when the operator "swings" the tray, by the use of the arms attached on both sides of the tray and base, from the initial end of the base to the end where the platform is located and pushes the tray against said platform the platform pushes the plantain out of the tray, whereas other apparatuses have a more complex lever mechanism or other similar mechanism to remove whatever object is being embossed or molded by the mold.

BRIEF DESCRIPTION OF DRAWINGS

The description of drawings is as follows:

FIG. 4a is a perspective view of the invention with its most current and best working measurements of the lid and its parts.

DETAILED DESCRIPTION OF THE INVENTION

Figure 1:
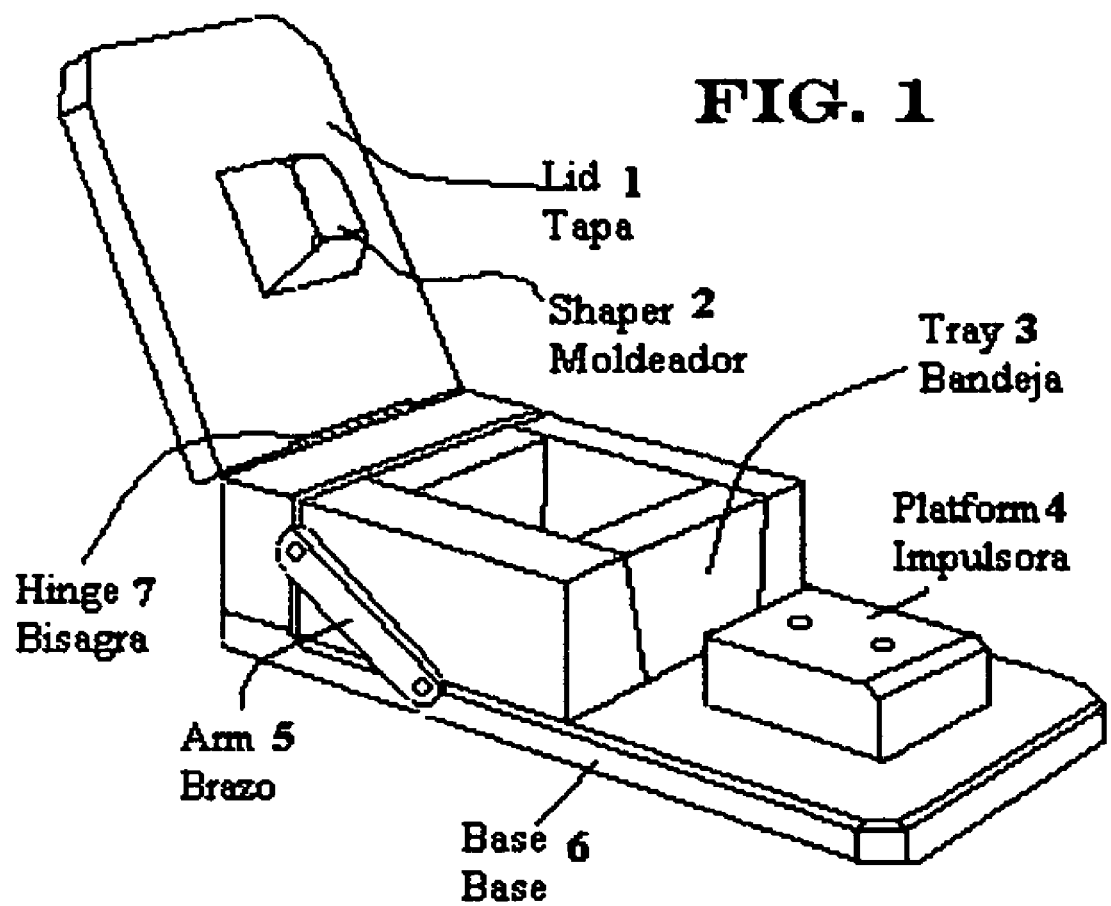
FIG. 1 is a perspective view of my improved "tostonera" ready to receive the fried plantain.
Figure 2:
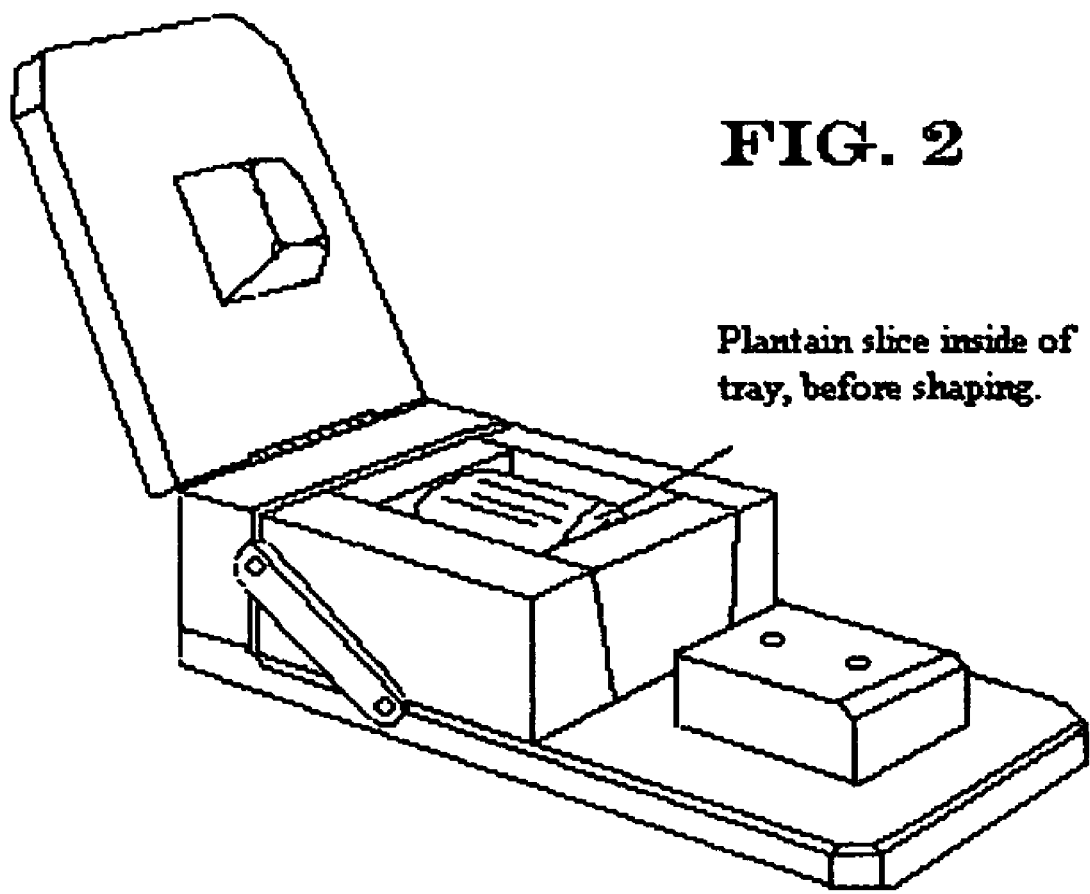
FIG. 2 is a perspective view of my improved "tostonera" with a plantain inside of the tray ready for shaping.
Figure 3:
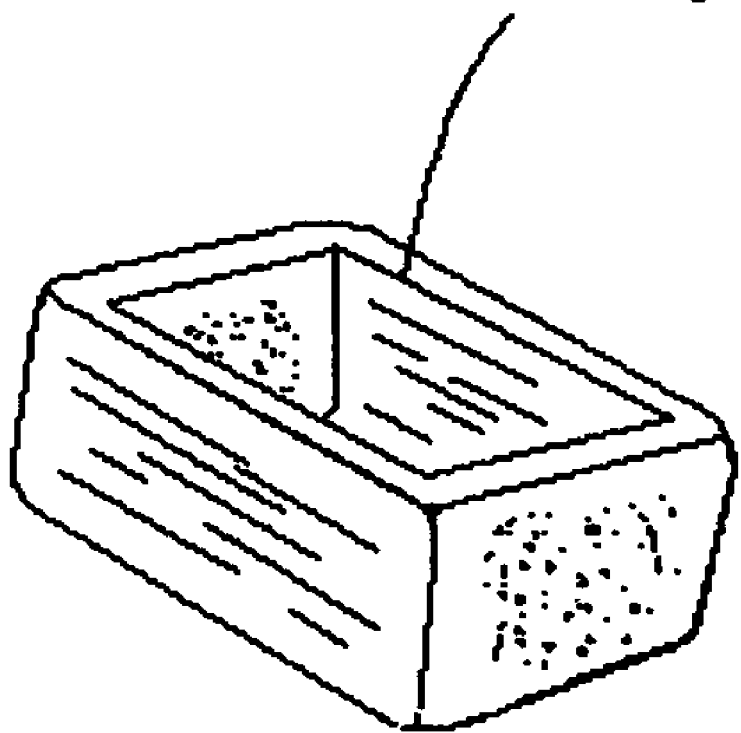
FIG. 3 is a view of the finished product, a rectangular, bowl-shaped plantain.
Figure 4B:
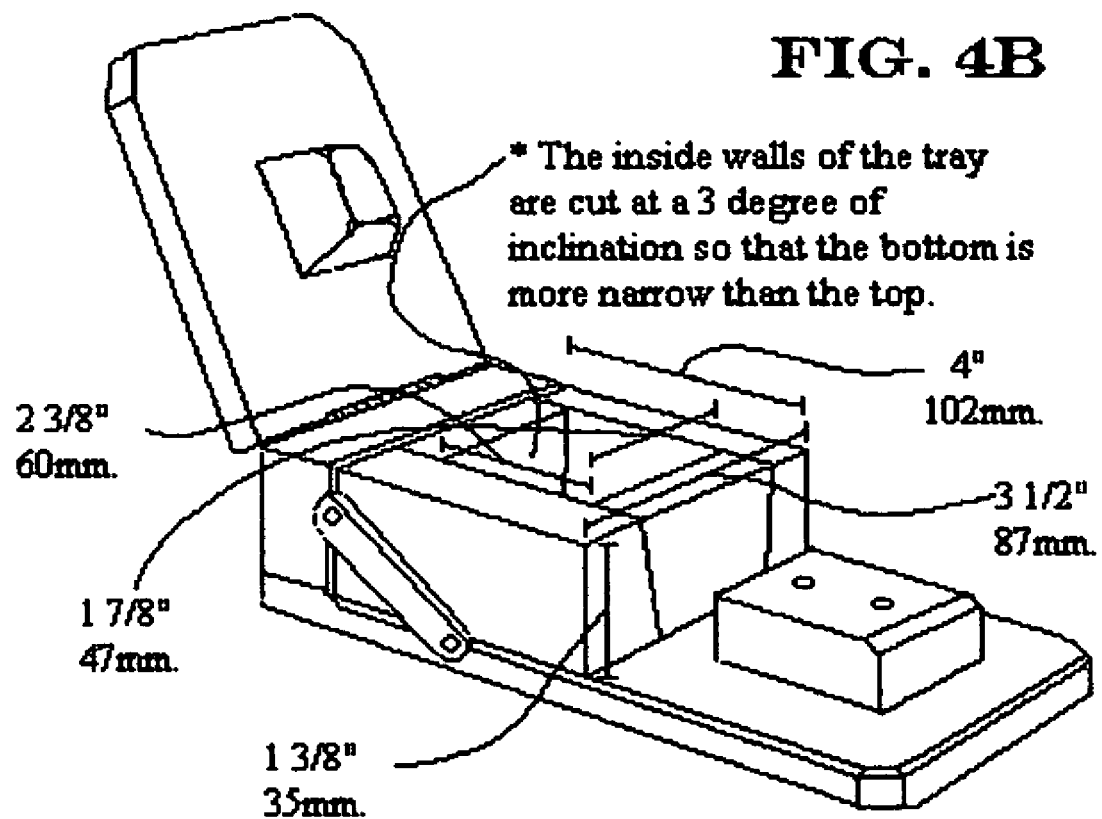
FIG. 4b is a perspective view of the invention with the most current and best working measurements of the tray.
Figure 4C:
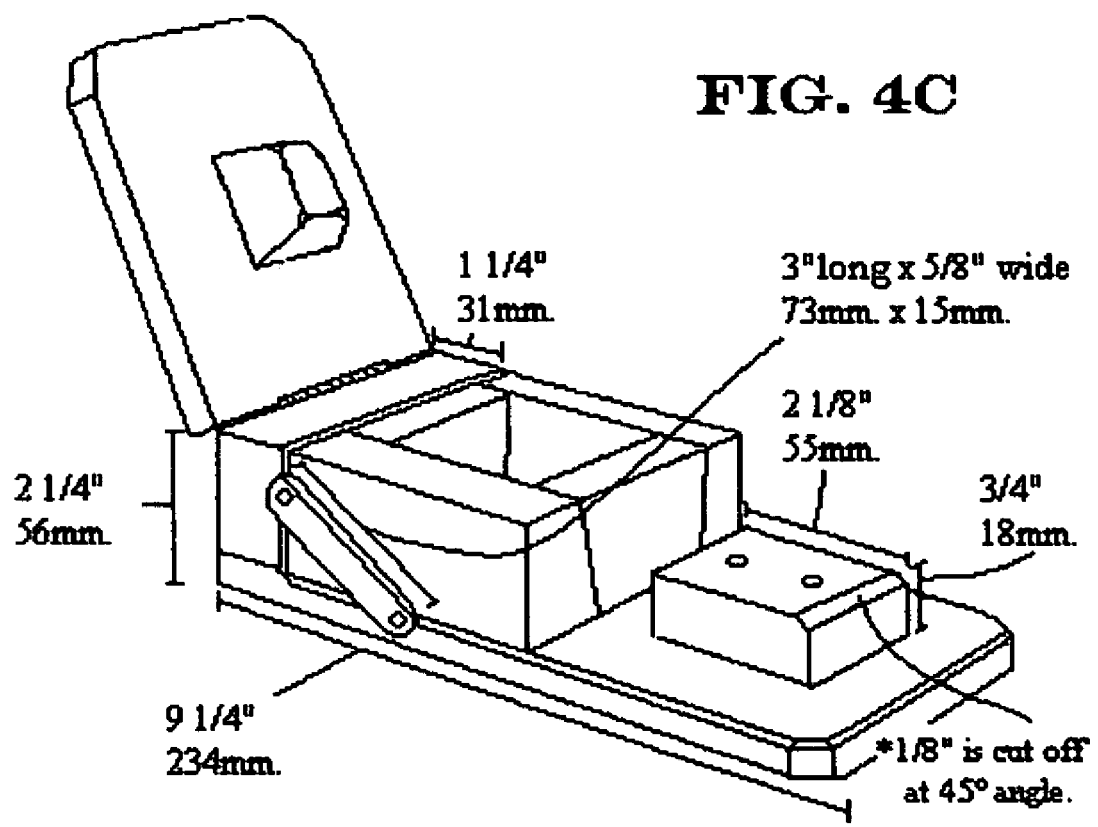
FIG. 4c is a perspective view of my invention and contains a view of the base and its parts and their current best working measurements.

In accordance with the apparatus of the present invention, FIG. 2 illustrates a wooden plantain molder where a slice of plantain is placed into a wooden tray 3 long ways, parallel to the length of the tray 3, after being fried the first time. The lid 1, which is fastened to the base 6 by a hinge 7, is closed toward the tray 3 and pressure is applied downward in order to shape the plantain within the tray 3 into a rectangular bowl shape by the use of a wooden shaper 2 attached to the lid 1. The lid 1 is then returned to its perpendicular position to the base 6. The tray 3, which is fastened to arms, which are also attached to the base 6 by said threaded devices, and carried toward the plateform 4. The operator then positions the tray above the platform and pushes down causing the plantain to be pushed up and out of the tray by the platform. The plantain is then ready to fry a second time.

This invention is meant for personal or even a commercial use. It can be used within someone's own kitchen or the kitchen of a restaurant that offers fried plantains. The apparatus is simple to use and the mechanism can be worked with the greatest of ease. The size of the plantain is very important to the functionality of this invention. A piece of plantain must, within reason, be no larger than 2¼" or smaller then 1¾" long and no larger than 1⅜" or smaller then 1" in diameter. Two small pieces of plantain may be used to take place of a large piece, taking into account aforementioned considerations.

It is obvious that the apparatus can be made of other material but still remain the same idea. Furthermore, other measurements, within proportion, would still retain the same spirit of this invention. An specifics mentioned within the description of said invention are for illustrative purposes and not for limitations. Much can be changed or altered but still retain the spirit of this invention.

What is claimed is:

1. An apparatus for molding a food product comprising a base, a lid with a shaper connected to the base by a hinge, a platform on the base that is used to push the molded food product out of a tray, said tray connected to the base by two arms, said two arms are connected to both the tray and the base, whereby the tray moves between a first position and a second position; and at said first position, said tray engages with said lid for forming the product, the tray moves from said first position via said arms to said second position along said base where said platform engages from the bottom of said tray which removes the product from the tray.

* * * * *